United States Patent [19]

Haberkern et al.

[11] Patent Number: 4,633,323

[45] Date of Patent: Dec. 30, 1986

[54] PICTURE/SOUND RECORDER WITH HINGED FLAT PICTURE SCREEN

[76] Inventors: Ottmar Haberkern, Reuchlinstrasse 24, D-6200 Wiesbaden; Horst Kahl, Kirchstr. 13, D-6148 Heppenheim, both of Fed. Rep. of Germany

[21] Appl. No.: 679,221

[22] Filed: Dec. 7, 1984

[30] Foreign Application Priority Data

Dec. 7, 1983 [DE] Fed. Rep. of Germany ....... 3344211

[51] Int. Cl.⁴ .............................................. H04N 5/64
[52] U.S. Cl. .................................... 358/254; 358/255; 379/53
[58] Field of Search ............ 358/254, 255; 179/2 TV, 179/146 E; 381/87, 88; D14/77, 79, 80

[56] References Cited

U.S. PATENT DOCUMENTS 4,481,382 11/1984 Villa-Real ........................ 179/2 TV

*Primary Examiner*—James J. Groody
*Assistant Examiner*—Edward L. Coles
*Attorney, Agent, or Firm*—Gifford, Groh, VanOphem, Sheridan, Sprinkle & Dolgorukov

[57] ABSTRACT

A device for black and white, color, stereo picture, holographic picture and stereo and other amplified sound reproduction and reception is described, which is characterized by a hinged housing A and B, one portion of which contains the picture reproduction screen 1. A pair of directional speaker units $2a + 2b$ are integrated in the hinge section of the device. Sound and picture reception units are located in the housing along with touch controls and auxiliary sockets which extend through the wall of the housing B and are located at the surfaces 3, 4a, and 4b.

7 Claims, 4 Drawing Figures

PICTURE/SOUND RECORDER WITH HINGED FLAT PICTURE SCREEN

BACKGROUND OF THE INVENTION

I. Field of the Invention

The invention is a device for picture and sound reproduction. The object of the present invention is to produce a device for picture and sound reproduction which is unsurpassed in compactness, ease of use and low cost.

II. Description of the Prior Art

The invention results in a device that does not exhibit the various disadvantages existing in the devices currently on the market. The reduction in size of the bulky picture tube into a small flat assembly having the size of today's tape recorders has permitted a wide distribution of such picture/sound reproduction devices. Many types of materials are currently available for use, as well as the digital technology for reception and reproduction; and it is thereby natural to ponder the appropriate market segment and sales potential. in its most economically attractive version such a device should cost only about one fifth of the sales price that one spends for a corresponding compact or integrated unit. This would make the invention of special interest for educational use (teaching programs, etc.). The full spectrum of applications would include the entire informational, entertainment and commercial program segments; as well as to picture telephones which may be accomplished simply by the addition of the required push buttons.

The objects of the present invention are achieved by providing a bottom housing with a hinged cover which contains a flat picture tube or screen. The bottom housing has a pair of spaced apart hinge portions having a large cross section in order to contain the stereo speakers. In combination with the loudspeaker hinge assembly, the housing contains electronics for the flat picture tube or screen, circuitry, battery space, and picture, sound tuning and amplification units, all of which are currently available as off the shelf items. Either direct viewing or recorded viewing can also be made available.

The remaining aspects of the invention conform with only minor variations to the current devices.

BRIEF DESCRIPTION OF THE DRAWINGS

Further significant features of the invention are described in the following drawings wherein it is to be understood that various combinations and embodiments are also possible within the scope of the invention.

FIGS. 1 and 2 show an embodiment of the invention (without intent to limit the invention to those illustrated embodiments).

DESCRIPTION OF A PREFERRED INVENTION

Figure 2B:
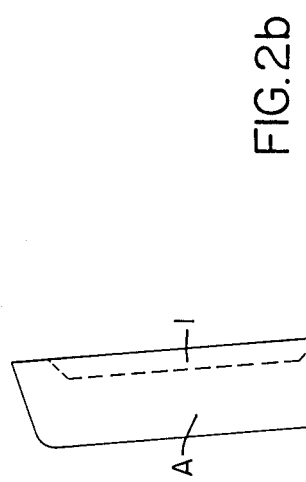
FIG. 2b is a side view of the device in the open configuration.
Figure 2A:
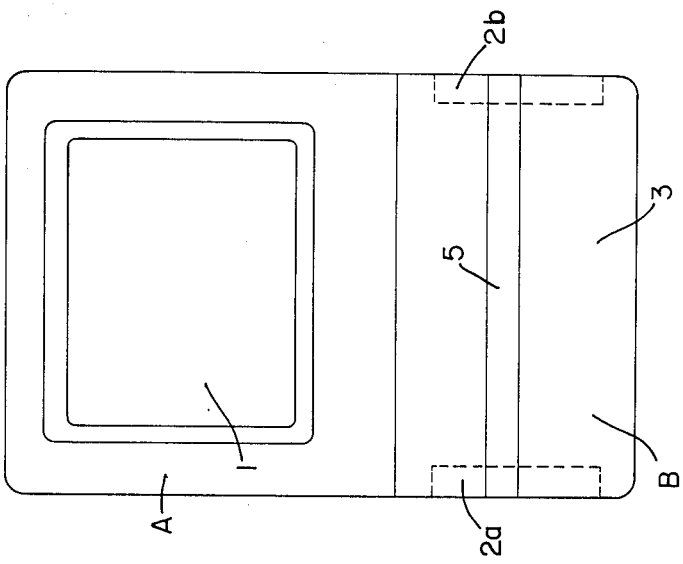
FIG. 2a is a front view of the device in an open configuration.

A device for sound and picture reproduction has a housing cover A as shown in FIG. 2a which contains a color picture tube 1 with an attached flat frame or an electro-chemical unit with light diodes or some other beamed light device, or a liquid crystal, or a plasma picture screen, or a UV switched tritium or light sensitive particle or striated screen, or other color sensitive coated flat picture screen.

Figure 1B:
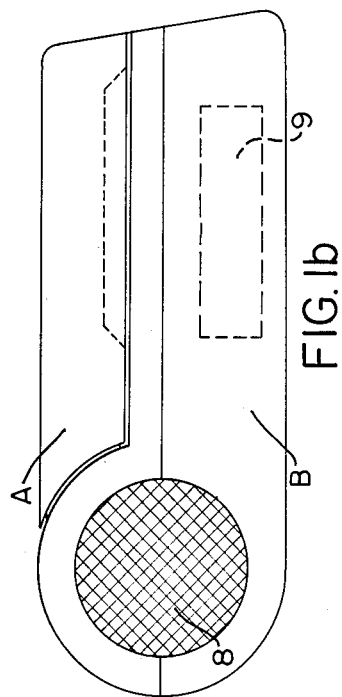
FIG. 1b is a schematic side view of the device in a closed configuration.
Figure 1A:
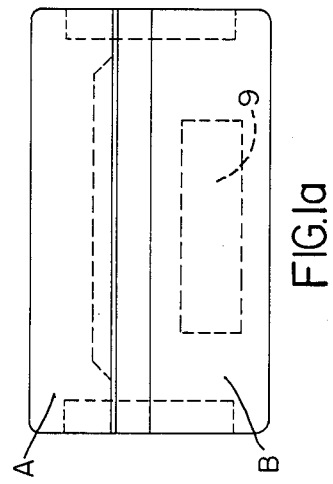
FIG. 1a is a schematic front view of the device in a closed configuration.

A bottom housing portion B, as shown in FIGS. 2a and 2b is pivotably mounted to the housing cover A. The housing cover may be pivoted between closed position as shown in FIGS. 1a and 1b and an open position as shown in FIGS. 2a and 2b. Electronic modules for operating the picture tube 1, battery space, circuitry, sound tuning and amplification units are positioned in an area 9 in the bottom housing. The electronic modules may be permanently or removably installed.

In the bottom housing portion B, a panel is provided for picture selection and adjustment controls which could encompass digital, analog or adjustable controls of either rotating knobs with labels or metallic or nonmetallic foil bands, program storage, as well as other available biological picture storage and laser activated systems. A removable picture taking module is also contemplated so that a television camera may be attached.

The device may be suited for use as a picture telephone, by positioning push buttons for dialing at the panel 5.

Side surfaces 4a and 4b and front surface 3, shown in FIG. 2b contain the selector controls and related auxiliary sockets that connect to the peripheral devices such as a home computer, video recorder, telephone connector or key board for graphic/letter printer and BTX.

large cross section hinges 2a and 2b as shown in FIG. 2b pivotally attach the housing cover A to the bottom portion B, such that the housing cover A is pivotable between a closed position as shown in FIG. 1b and an open position as shown in FIG. 2b. The hinges 2a and 2b contain miniature stereo speakers 8. The further development of large picture screens raises the possibility of the picture screen and the enclosable control being attached to a wall, and for this purpose the display apparatus contains on its underside an outwardly folding flap with a supplementary remote control of the high frequency, micro-wave, infrared or laser beams type.

I claim:

1. A device for video and sound reproduction and for recording sound and video comprising: a pair of housings bound together by a pair of hinges, one of said pair of housings having a picture reproducer for displaying a picture in an opening, an other of said pair of housings having a speaker mounted in each of said pair of hinges, said other housing having a sound and picture receiving unit and further having controls and auxiliary sockets extending through a wall of said other housing.

2. The device as claimed in claim 1, further comprising: transmission receiving modules positioned in said other housing, said other housing having picture and sound carrier controls.

3. A device for video and sound reproduction and for video and sound recording comprising:
   a cover housing portion;
   a means for video display mounted in said cover housing portion;
   a bottom housing portion pivotally mounted to said cover housing portion, said cover housing portion pivotable between an open position and a closed position; said bottom housing portion having a pair of end portions;

a pair of speakers, each of said pair mounted in a respective one of said pair of end portions of said bottom housing portion;

means for receiving video and audio signals mounted in said bottom housing, said means for communicating with said means for video display and said pair of speakers for sound reproduction and video display.

4. The device as claimed in claim 3, wherein each of said pair of end portions of said bottom housing portion have a surface arched about a central axis.

5. The device as claimed in claim 4, wherein said cover housing portion pivots about said central axis.

6. The device as claimed in claim 3, wherein said lower housing portion further comprises means for controlling said means for receiving video and audio signals.

7. The device as claimed in claim 6, wherein said bottom housing portion further comprises a panel portion, said means for controlling mounted to said panel portion.

* * * * *